2,816,141

PROCESS FOR OXALYL CHLORIDE PRODUCTION

Ellsworth K. Ellingboe, Highland Woods, Del., assignor to E. I. du Pont de Nemours and Company, Wilmington, Del., a corporation of Delaware No Drawing. Application July 1, 1955,
Serial No. 519,661

13 Claims. (Cl. 260—544)

This invention relates to a new process for the production of hydrogen-free acid chlorides and more particularly of oxalyl chloride.

Oxalyl chloride is of considerable importance due to the activity of the two chlorines. The activity of oxalyl chloride, the most active of the organic acid chlorides, as a chlorinating or dehydrating agent, approaches that of inorganic chlorides such as thionyl chloride or phosphorus trichloride. Oxalyl chloride is more versatile as a reagent than other organic acid chlorides. As a bifunctional acid chloride, oxalyl chloride reacts with diamines to form polyamides and even reacts with both of the nitrogens of urea to form oxalylurea.

Oxalyl chloride has been prepared by the use of a very large excess of phosphorus pentachloride on oxalic acid. Even under these conditions only a fair yield of oxalyl chloride is obtained. Other more conventional means of acid chloride preparation do not work with oxalic acid, presumably because replacement of one hydroxyl with chlorine gives a half acid chloride which reacts internally to subsequently produce hydrogen chloride, carbon monoxide and carbon dioxide rather than reacting in the expected manner with more of the acid chloride forming reagent. Oxalyl chloride would find considerably greater commercial utility if it could be obtained both readily and economically.

This invention has as an object a new process for the preparation of oxalyl chloride. Other objects will appear hereinafter.

These objects are accomplished by the present invention wherein oxalyl chloride is prepared from a lower (1-4 carbon) alkyl diester of oxalic acid which ester is free of active hydrogen and in which ester the alpha carbon of each of the monohydric alcohol moieties bears at least two chlorines by treatment of the diester at 35-130° C. with a carbon containing catalyst which is an activated charcoal or a compound of a trivalent element of atomic number of 7 to 33 in group VA, the three valences of the element being satisfied by hydrocarbon radicals, except that one but no more than one valence may be satisfied by a group in which the carbon directly attached to said element, is double bonded to oxygen or sulfur (i. e., a chalcogen of atomic number not more than 16). The group VA elements are nitrogen, phosphorus and arsenic (see 1951 Fisher Periodic Chart).

The formation of oxalyl chloride takes place at temperatures of 35-130° C., which are below the boiling point of the halogenated ester in the presence of the catalyst. The oxalyl chloride is readily separated by distillation.

The following example further illustrates the preparation of oxalyl chloride by the process of this invention.

EXAMPLE I

*Oxalyl chloride from bis-trichloromethyl oxalate*

A mixture of 30 g. of bis-trichloromethyl oxalate and 30 ml. of chlorobenzene was placed in the distillation pot of a small fractionating column which was vented through a "Dry-Ice" cooled trap. About 0.1 g. of pyridine was added to the mixture, and an immediate reaction occurred with the formation of a yellow solid and white fumes which soon subsided. A slight evolution of gas took place at room temperature, and when the mixture was heated a smooth continuous formation of gas with ebullition occurred at 50° C.–60° C. The column was kept on total reflux by a water cooled condenser, and as the pot temperature was slowly increased to 80° C.–85° C. the head temperature gradually rose to a constant 62° C. A distillate, B. P. 62° C., was then collected until the beginning of a sharp rise in head temperature was obtained. A distillate weighing 7.3 g. was identified as oxalyl chloride by boiling point and reaction with aniline to form oxanilide, M. P. 225° C.–257° C. A low boiling liquid which condensed in the "Dry-Ice" trap was identified as phosgene by its reaction with aniline to form carbanilide, M. P. 246° C.–247° C. The melting points of the anilides were determined by means of a thermocouple-calibrated Fisher-Johns melting point block.

When the procedure of Example I is repeated with the exception that the catalyst used was that of Table I below, oxalyl chloride and phosgene are obtained.

TABLE I

Activated charcoal ("Darco G–60")
Triethylamine
Triphenylphosphine
Triphenylarsine
Dimethylformamide
Tetramethylthiuram disulfide
Tetraethylthiuram disulfide The bis-trichloromethyl oxalate was prepared by the following procedure: A solution of 118 g. (1.0 mol) of freshly distilled anhydrous dimethyl oxalate in 250 ml. of carbon tetrachloride was chlorinated under reflux with irradiation at close range by two 275 watt RS sun lamps. Chlorine was introduced rapidly through a gas inlet tube but at a rate insufficient to flood the reflux condenser. The temperature increased from 75° C. to about 85° C. during the course of 16 hours while 540 g. (7.6 mol) of chlorine was introduced. The reaction was considered complete when the yellow color of unreacted chlorine persisted for 15 minutes after the flow of chlorine was stopped. Upon removal of carbon tetrachloride under reduced pressure, the product was obtained as a white crystalline solid; weight, 314 g., M. P. 75° C.–85° C. (dec.). Analysis: calculated for $C_4Cl_6O_4$, Cl, 65.55%; found: Cl, 65.04%. Reaction with aniline in carbon tetrachloride was instantaneous to yield a mixture of oxanilide, M. P. 255° C.–257° C.; and carbanilide, M. P. 246° C.–247° C.

Bis-trichloromethyl oxalate was also prepared by a substantial repetition of the above procedure except that 1% of azodiisobutyronitrile (based on the dimethyl oxalate) was additionally present during the chlorination.

This invention is generic to the process for the production of oxalyl chloride by contacting, with a catalyst, an oxalic acid diester of monohydric alcohols each of which contain a plurality of chlorine atoms on the oxygen-bearing carbons. These compounds have the general formula

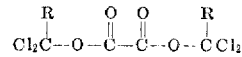

wherein R is chlorine, hydrogen or 1–4 carbon alkyl radicals. Although bis(dichloromethyl) oxalate can be employed, the most useful compounds for the production of oxalyl chloride by the process of this invention are those containing no hydrogen on each of the alpha carbons of the monohydric alcohol moieties of the diester. Bis-trichloromethyl oxalate is a preferred source of oxalyl chloride because it is readily available and in the presence of a basic catalyst also gives phosgene as shown by the equation

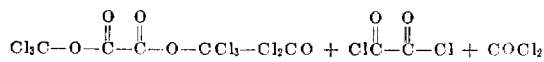

Phosgene is also a reactive dibasic acid chloride.

The chlorinated esters of oxalic acid employed as sources for oxalyl chloride are obtained by the replacement by chlorine of at least two of the alpha hydrogens of each of the monohydric alcohol portions of the diester. This is readily accomplished by the use of actinic light to bring about the substitution chlorination. The chlorination is generally effected in an inert solvent such as carbon tetrachloride at a temperature of 50° C.–125° C. The number of chlorines introduced is readily determined by ascertaining the weight gain of the product or by analysis of the chlorinated ester.

The production of oxalyl chloride from the chlorinated esters of oxalic acid as hereinbefore described takes place in the presence of small amounts, usually 0.01 to 10%, by weight of the chloroester of a catalyst. Tertiary amines are readily available catalysts. Of the tertiary amines those which are hydrocarbon except for the nitrogen, e. g., tripropylamine, triamylamine, dimethylaniline, pyridine and quinoline are preferred. Also useful are the tertiary phosphines and arsines such as triphenylphosphine and triphenylarsine. Amides of secondary amines are likewise operable. These compounds can be represented by the formula RR'R''M wherein at least two of the R's are hydrocarbon, of generally up to 6 carbons provided that one of the R's may be a radical of up to 6 carbons directly attached to the element M by carbon which is also doubly bonded to oxygen or sulfur, and M is N, P, or As, i. e., an element of atomic number 7 to 33 in group VA of the Fisher Periodic Chart. A further group of catalysts also included in this invention is that of the charcoals of vegetable origin, which generally have a large surface area. Tertiary amines, amides of secondary amines, tertiary phosphines, tertiary arsines and activated charcoal of vegetable origin are generically useful in the process of this invention.

The compounds employed as catalysts except for the charcoals, are generally soluble to some extent in the reaction system. When compounds which have low solubility in the chloroester are used, an inert diluent can be employed. The reaction accordingly takes place in a liquid medium and such inert diluents as chlorobenzene can be present.

The time of reaction depends on the temperature and the specific catalyst employed. Times of from an hour to several hours are generally used at temperatures of 35° C.–130° C. With the preferred catalysts, reaction is rapid at 60° C.–80° C. This is a convenient temperature range since the oxalyl chloride, B. P. 62° C,. is readily isolated by distillation.

As shown in the example and in the equation, bistrichloromethyl oxalate produces not only oxalyl chloride in excellent yields but also phosgene. Phosgene is a valuable dibasic acid chloride since it is quite reactive and useful in the synthesis of ureas, carbonates, isocyanates, and many other compounds.

Oxalyl chloride is a very reactive compound. It reacts with hydrogen-bearing amines. With diamines such as hexamethylenediamine a high molecular weight polyamide is obtained. It reacts with alcohols to yield oxalic esters. Oxalyl chloride is a chlorinating agent. Thus it converts the carbonyl group of an aliphatic ketone to a dichloromethane group and other carboxylic acids to the corresponding acid chlorides. Oxalyl chloride may also be used as a dehydrating agent. Thus it can be employed to convert dibasic acids to their anhydrides.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of oxalyl chloride wherein bis(tricholoromethyl) oxalate is brought in contact, at a temperature within the range 35–130° C. but below the boiling point of said ester, with pyridine and the resulting oxalyl chloride is separated.

2. The process for the preparation of oxalyl chloride wherein a chlorinated dimethyl ester of oxalic acid having at least two chlorines on each of the noncarboxyl carbons is brought in contact, at a temperature within the range 35–130° C. but below the boiling point of said ester, with pyridine and the resulting oxalyl chloride is separated.

3. The process for the preparation of oxalyl chloride wherein a neutral ester of oxalic acid with an $\alpha,\alpha$-dichloroalkanol of one to four carbons is brought in contact, at a temperature within the range 35–130° C. but below the boiling point of said ester, with pyridine and the resulting oxalyl chloride is separated.

4. The process for the preparation of oxalyl chloride wherein a neutral ester, free from active hydrogen, of oxalic acid with an alcohol having all hydrogens on the carbinol carbon replaced by chlorine is brought in contact, at a temperature within the range 35–130° C. but below the boiling point of said ester, with pyridine and the resulting oxalyl chloride is separated.

5. The process for the preparation of oxalyl chloride wherein an oxalic acid ester of the formula

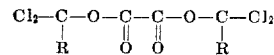

wherein R is a member of the group consisting of chlorine, hydrogen and monovalent hydrocarbon radicals of up to four carbons, is brought in contact, at a temperature within the range 35–130° C. but below the boiling point of said ester, with pyridine and the resulting oxalyl chloride is separated.

6. The process for the preparation of oxalyl chloride wherein a neutral ester, free from active hydrogen, of oxalic acid with an alcohol having all hydrogens on the carbinol carbon replaced by chlorine is brought into contact, at a temperature within the range 35–130° C. but below the boiling point of said ester, with a tertiary amine and the resulting oxalyl chloride is separated.

7. The process for the preparation of oxalyl chloride wherein a neutral ester, free from active hydrogen, of oxalic acid with an alcohol having all hydrogens on the carbinol carbon replaced by chlorine is brought into contact, at a temperature within the range 35–130° C. but below the boiling point of said ester, with a catalytic amount of a compound $R_3M$ wherein R is a hydrocarbon radical of up to six carbons, and M is a group VA element within the range of 7 to 33 in atomic number.

8. The process for the preparation of oxalyl chloride wherein a neutral ester, free from active hydrogen, of oxalic acid with an alcohol having all hydrogens on the carbinol carbon replaced by chloride is brought into contact, at a temperature with the range 35–130° C. but below the boiling point of said ester, with a catalytic amount of active carbon.

9. The process for the preparation of oxalyl chloride wherein a neutral ester, free from active hydrogen, of oxalic acid with an alcohol of 1 to 4 carbons having all hydrogens on the carbonal carbon replaced by chlorine is brought into contact, at a temperature within the range 35–130° C. but below the boiling point of said ester, with a catalyst free from active hydrogen and of the class consisting of activated carbon of vegetable origin, tertiary amines, amides of secondary amines, tertiary arsines, and tertiary phosphines.

10. The process for the preparation of oxalyl chloride wherein a neutral ester of oxalic acid with an α,α-dichloroalkanol of one to four carbons is brought in contact, at a temperature within the range 35–130° C. but below the boiling point of said ester, with a tertiary amine and the resulting oxalyl chloride is separated.

11. The process for the preparation of oxalyl chloride wherein a chlorinated dimethyl ester of oxalic acid having at least two chlorines on each of the noncarboxyl carbons is brought in contact, at a temperature within the range 35–130° C. but below the boiling point of said ester, with a tertiary amine and the resulting oxalyl chloride is separated.

12. The process for the preparation of oxalyl chloride wherein bis(trichloromethyl) oxalate is brought in contact, at a temperature within the range 35–130° C. but below the boiling point of said ester, with a tertiary amine and the resulting oxalyl chloride is separated.

13. The process for the preparation of oxalyl chloride wherein a neutral ester, free from active hydrogen, of oxalic acid with an alcohol of 1 to 4 carbons having all hydrogens on the carbinol carbon replaced by chlorine is brought into contact, at a temperature within the range 35–130° C. but below the boiling point of said ester, with a catalytic amount of a tertiary compound of a tervalent element of group VA of the periodic system and of atomic number from 7 to 33 in which compound the three valences of said group VA element are satisfied by hydrocarbon radicals with the proviso that the carbon joining one of said hydrocarbon radicals to the group VA element may be doubly bonded to chalcogen of atomic number not more than 16.

References Cited in the file of this patent

FOREIGN PATENTS 330,511    Great Britain _____ June 2, 1930

OTHER REFERENCES

Hood et al.: J. Phys. Chem., vol. 23, pp. 508–509.

UNITED STATES PATENT OFFICE

CERTIFICATE OF CORRECTION

Patent No. 2,816,141 December 10, 1957

Ellsworth K. Ellingboe

It is hereby certified that error appears in the printed specification of the above numbered patent requiring correction and that the said Letters Patent should read as corrected below.

Column 1, line 56, for "double" read --doubly--; column 2, line 15, for "225° C." read --255° C.--; column 4, line 57, for "range of 7" read --range 7--; line 61, for "chloride" read --chlorine--; line 62, for "with" read --within--; line 68, for "carbonal" read --carbinol--.

Signed and sealed this 18th day of February 1958.

(SEAL)
Attest:

KARL H. AXLINE
Attesting Officer

ROBERT C. WATSON
Commissioner of Patents